(12) United States Patent
Rothenberg

(10) Patent No.: US 8,995,049 B2
(45) Date of Patent: Mar. 31, 2015

(54) METHOD AND APPARATUS FOR SUPPRESSION OF STIMULATED BRILLOUIN SCATTERING USING POLARIZATION CONTROL WITH A BIREFRINGENT DELAY ELEMENT

(75) Inventor: Joshua E. Rothenberg, Los Angeles, CA (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 700 days.

(21) Appl. No.: 13/227,640

(22) Filed: Sep. 8, 2011

(65) Prior Publication Data
US 2013/0063808 A1    Mar. 14, 2013

(51) Int. Cl.
| | | |
|---|---|---|
| *H01S 3/13* | (2006.01) | |
| *H01S 3/067* | (2006.01) | |
| *H01S 3/08* | (2006.01) | |
| *H01S 3/23* | (2006.01) | |

(52) U.S. Cl.
CPC ........... *H01S 3/1308* (2013.01); *H01S 3/08054* (2013.01); *H01S 3/06712* (2013.01); *H01S 3/06754* (2013.01); *H01S 3/1307* (2013.01); *H01S 3/2383* (2013.01); *H01S 2301/03* (2013.01)
USPC .......................... 359/337; 359/346; 359/349

(58) Field of Classification Search
CPC ............ H01S 3/06712; H01S 3/06754; H01S 3/08054; H01S 3/1307; H01S 3/1308; H01S 3/2383; H01S 2301/03
USPC .......................... 359/337, 346, 349
See application file for complete search history.

(56) References Cited

U.S. PATENT DOCUMENTS

| | | | | | |
|---|---|---|---|---|---|
| 3,272,988 | A | * | 9/1966 | Bloom et al. | 398/65 |
| 3,752,992 | A | * | 8/1973 | Fluhr | 398/65 |
| 3,956,626 | A | * | 5/1976 | Ross | 398/184 |
| 4,886,334 | A | * | 12/1989 | Aoki | 359/333 |
| 5,015,053 | A | * | 5/1991 | Johnson | 385/2 |
| 5,111,322 | A | * | 5/1992 | Bergano et al. | 398/74 |
| 5,537,671 | A | * | 7/1996 | Toyama et al. | 385/27 |
| 5,596,441 | A | * | 1/1997 | Sakakibara et al. | 398/205 |

(Continued)

OTHER PUBLICATIONS

T.M. Shay et al; Self-Referenced Locking of Optical Coherence by Single-detector Electronic-Frequency Tagging; Proceedings of SPIE v. 6102, 61020V; 2006; pp. 1-5.

(Continued)

*Primary Examiner* — Ari M Diacou
(74) *Attorney, Agent, or Firm* — Carmen Patti Law Group, LLC

(57) ABSTRACT

A method and apparatus for suppression of stimulated Brillouin scattering (SBS) includes a master oscillator (MO) that generates a beam; a birefringent element that receives and transmits the beam, wherein the beam is transmitted with a transmission delay between two orthogonal axes; a polarization controller that receives the beam and transmits the beam with a desired polarization; a fiber amplifier that receives the beam, amplifies the beam, and transmits a beam; a compensating birefringent element that receives the beam, approximately removes the transmission delay between the two axes of the beam, and transmits an output beam; and a polarization detector that detects the output beam's polarization and provides feedback to the polarization controller to ensure that the polarization of the output beam is approximately equal to a desired output polarization, so as to reduce SBS.

22 Claims, 7 Drawing Sheets

(56) References Cited

U.S. PATENT DOCUMENTS

| | | | |
|---|---|---|---|
| 5,600,474 A * | 2/1997 | Tomesen et al. | 398/205 |
| 5,608,560 A * | 3/1997 | Abram et al. | 398/185 |
| 5,900,957 A * | 5/1999 | Van Der Tol | 398/54 |
| 6,310,720 B1 * | 10/2001 | Walker et al. | 359/344 |
| 6,545,800 B1 * | 4/2003 | Wilson et al. | 359/341.4 |
| 6,552,836 B2 * | 4/2003 | Miller | 359/237 |
| 6,661,814 B1 | 12/2003 | Chapman et al. | |
| 6,833,946 B2 * | 12/2004 | Islam | 359/334 |
| 7,002,733 B2 * | 2/2006 | Dagenais et al. | 359/337 |
| 7,050,222 B2 * | 5/2006 | Yu et al. | 359/344 |
| 7,202,996 B2 * | 4/2007 | Popov et al. | 359/337.11 |
| 7,268,936 B2 * | 9/2007 | Onaka et al. | 359/341.41 |
| 7,343,100 B2 * | 3/2008 | Yao | 398/152 |
| 7,375,878 B2 * | 5/2008 | Akiyama | 359/344 |
| 7,447,441 B2 * | 11/2008 | Alleston et al. | 398/152 |
| 8,032,025 B2 * | 10/2011 | Ibragimov et al. | 398/65 |
| 8,184,363 B2 * | 5/2012 | Rothenberg | 359/349 |
| 8,379,301 B2 * | 2/2013 | Wang | 359/344 |
| 8,427,769 B1 * | 4/2013 | Stultz | 359/885 |
| 8,543,006 B2 * | 9/2013 | Vassilieva et al. | 398/158 |
| 2002/0003641 A1 * | 1/2002 | Hall et al. | 359/122 |
| 2002/0097766 A1 * | 7/2002 | Tsukiji et al. | 372/50 |
| 2002/0176080 A1 * | 11/2002 | Iwata | 356/369 |
| 2002/0196541 A1 * | 12/2002 | Cai | 359/497 |
| 2004/0246568 A1 * | 12/2004 | Onaka et al. | 359/337 |
| 2005/0074906 A1 * | 4/2005 | Kochersperger | 438/7 |
| 2005/0201429 A1 * | 9/2005 | Rice et al. | 372/27 |
| 2005/0226632 A1 * | 10/2005 | Alleston et al. | 398/152 |
| 2006/0120412 A1 * | 6/2006 | Liu | 372/6 |
| 2006/0227816 A1 * | 10/2006 | Liu | 372/6 |
| 2008/0253417 A1 * | 10/2008 | Livingston | 372/38.02 |
| 2009/0185176 A1 * | 7/2009 | Livingston et al. | 356/237.2 |
| 2009/0185590 A1 * | 7/2009 | Livingston | 372/29.023 |
| 2010/0098420 A1 * | 4/2010 | Ibragimov et al. | 398/65 |

OTHER PUBLICATIONS

Justin B. Spring et al; Comparison of Stimulated Brillouin Scattering Thresholds and Spectra in Non-Polarization-Maintaining and Polarization-Maintaining Passive Fibers; Proceedings of SPIE v. 5709; pp. 147-156; SPIE, Bellingham, WA 2005.

M.A. Vorontsov et al; Stochastic Parallel-Gradient-Descent Technique for High-Resolution Wave-Front Phase-Distortion Correction; J. Optical Society of America A; vol. 15, No. 10; Oct. 1998; pp. 2745-2758.

Rudiger Paschotta; Field Guide to Optical Fiber Technology Book; 2010; pp. 1-4, 32, 48, 96-116.

* cited by examiner

METHOD AND APPARATUS FOR SUPPRESSION OF STIMULATED BRILLOUIN SCATTERING USING POLARIZATION CONTROL WITH A BIREFRINGENT DELAY ELEMENT

BACKGROUND

The invention relates generally to suppressing stimulated Brillouin scattering (SBS) and more particularly to suppressing SBS using polarization control with a birefringent delay element in a fiber amplifier beam combination system.

Stimulated Brillouin Scattering refers to nonlinear effects in high power fibers under which optical power is scattered inelastically in the backward direction. Scatter in the backward direction is caused by an interaction of photons and acoustic or vibrational phonons. Acoustics in the fiber are caused by electrostriction due to the electric field produced by the beam of light in the fiber. Acoustic energy in the fiber causes light to be reflected in the backward direction and consequently interferes with the propagation of light forward. This results in a drop of useful output signal. The frequency of the back scattered beam is slightly lower than that of the original beam.

The frequency shift corresponds to the frequency of emitted phonons due to the Stokes process. This shift, known as the Brillouin shift, is equal to the energy of the phonon excited by the propagating laser signal. At a sufficiently high power in the forward direction of the fiber, some of the signal is back scattered at the Brillouin shifted frequency. SBS is a process whereby nonlinear optical gain produces amplification of the back scattered light. That is, the interference with the light being propagated in the forward direction is not linearly related to the optical power. Instead, SBS effects are not incurred until an SBS threshold of optical power is met. Soon thereafter, the SBS back scattered optical power overwhelms the optical power in the forward direction.

Due to the power limiting effects of SBS, it is generally desirable to suppress it as much as possible.

SUMMARY

In one set of embodiments, there is provided an apparatus for suppression of SBS using polarization control with a birefringent delay element in a fiber amplifier beam combination system.

In one set of embodiments, there is provided an apparatus comprising a master oscillator (MO) configured to generate a beam; a birefringent element configured to receive the beam from the MO and to transmit the beam, wherein the beam is transmitted with a delay between two orthogonal axes; a polarization controller configured to receive the beam from the birefringent element and to transmit the beam with a desired polarization; a fiber amplifier configured to receive the beam from the polarization controller, to amplify the beam, and to transmit the beam; a compensating birefringent element configured to receive the beam from the fiber amplifier, to approximately remove the transmission delay between the two axes of the beam, and to transmit an output beam; and a polarization detector configured to detect the polarization of the output beam and to provide feedback to the polarization controller to ensure that the polarization of the output beam is approximately equal to a desired polarization, so as to reduce SBS.

In another embodiment, there is provided an apparatus comprising a master oscillator (MO) configured to generate a beam; a beam splitter configured to receive the beam from the MO and to split it into a plurality of beams; a piston phase modulator configured to receive the beams from the beam splitter and to adjust the beam phases to a desired value; a birefringent element configured to receive the beams from the piston phase modulator and to transmit the beams, wherein at least one of the plurality of beams is transmitted with a delay between two orthogonal axes; a polarization controller configured to receive the beams and to transmit the beams with desired polarizations; a fiber amplifier configured to receive the beams from the polarization controller, to amplify the beams, and to transmit the beams; a combiner configured to receive the beams from the fiber amplifier, to combine the beams into an integrated output beam, and to transmit the output beam; a compensating birefringent element configured to receive the output beam from the combiner, to approximately remove the delay between the two axes of at least one of the beams, and to transmit the output beam; a polarization detector configured to detect the polarization of the output beam; and a polarization processor configured to provide feedback to the polarization controller to ensure that the polarizations of the components of the output beam are approximately equal to a desired polarization so as to reduce SBS.

In a further embodiment, there is provided an apparatus comprising a master oscillator (MO) configured to generate a beam; a beam splitter configured to receive the beam from the MO and to split it into a plurality of beams; a piston phase modulator configured to receive the plurality of beams from the beam splitter and to adjust the phases of one or more of the plurality of beams to desired phases; a birefringent element configured to receive the beams from the piston phase modulator and to transmit the beams, wherein at least one of the plurality of beams is transmitted with a delay between two orthogonal axes; a polarization controller configured to receive the beams and to transmit the beams with desired polarizations; a fiber amplifier configured to receive the beams from the polarization controller, to amplify the beams, and to transmit the beams; a combiner configured to receive the beams from the fiber amplifier, to coherently combine the plurality of beams into an integrated output beam, and to transmit an output beam; a beam sampler configured to receive the beams from the combiner, to sample the output beam, to transmit the output beam, and to reflect a low power beam; a compensating birefringent element configured to receive the low power beam from the beam sampler, to approximately remove the transmission delay between the two axes of the low power beam, and to transmit the low power beam; a phase detector configured to detect the phase of the low power beam; a phase processor configured to provide feedback to the piston phase modulator to ensure that the output beam has the desired phase; a polarization detector configured to detect the polarization of the output beam; and a polarization processor configured to provide feedback to the polarization controller to ensure that the polarization of the output beam is approximately equal to a desired output polarization, so as to reduce SBS.

In yet another embodiment, there is provided an apparatus comprising a master oscillator (MO) configured to generate a beam; a birefringent element configured to receive the beam from the MO and to transmit the beam, wherein the beam is transmitted with a delay between two orthogonal axes; a beam splitter configured to receive the beam and to split it into a plurality of beams; a piston phase modulator configured to receive the plurality of beams and to adjust the phases of one or more of the plurality of beams to desired phases; a polarization controller configured to receive the beams and to transmit the beams with desired polarizations; a fiber amplifier configured to receive the beams from the polarization controller, to amplify the beams, and to transmit the beams; a combiner configured to receive the beams from the fiber amplifier, to combine the plurality of beams into an integrated output beam, and to transmit an output beam; a compensating birefringent element configured to receive the output beam from the combiner, to approximately remove the delay between the two axes of at least one of the output beams, and to transmit the output beam; a phase detector configured to detect the phase of the output beam; a phase processor configured to provide feedback to the piston phase modulator to ensure that the plurality of phase-modulated beams have the desired phases; a polarization detector configured to detect the polarization of the output beam; and a polarization processor configured to provide feedback to the polarization controller to ensure that the polarization of the output beam is approximately equal to a desired output polarization, so as to reduce SBS.

In a still further embodiment, there is provided an apparatus comprising a plurality of master oscillators (MO's) configured to generate a plurality of beams of differing wavelengths and differing angles of incidence; a birefringent element configured to receive the plurality of beams from the plurality of MO's and to transmit the beams, wherein the beams are transmitted with a delay between two orthogonal axes; a polarization controller configured to receive the beams and to transmit the beams with desired polarizations; a fiber amplifier configured to receive the beams from the polarization controller, to amplify the beams, and to transmit the beams; a compensating birefringent element configured to receive the beams from the fiber amplifier, to approximately remove the delay between the two axes of at least one of the beams, and to transmit the beams; a combiner configured to receive the beams from the compensating birefringent element, to combine the plurality of beams into an integrated output beam, and to transmit an output beam; a polarization detector configured to detect the polarization of the output beam; and a polarization processor configured to provide feedback to the polarization controller to ensure that the polarization of the output beam is approximately equal to a desired output polarization, so as to reduce SBS.

In yet another embodiment, there is provided a method for reducing SBS, comprising providing an SBS reduction apparatus comprising a master oscillator (MO) configured to generate a beam; a birefringent element configured to receive the beam from the MO and to transmit the beam, wherein the beam is transmitted with a transmission delay between two orthogonal axes; a polarization controller configured to receive the beam from the birefringent element and to transmit the beam with a desired polarization; a fiber amplifier configured to receive the beam from the polarization controller, to amplify the beam, and to transmit the beam; a compensating birefringent element configured to receive the beam from the fiber amplifier, to approximately remove the transmission delay between the two axes of the beam, and to transmit the beam; and a polarization detector configured to detect the polarization of the output beam and to provide feedback to the polarization controller; generating a beam using the MO; and controlling the polarization of the output beam using the polarization controller to ensure that the polarizations of the components of the output beam are approximately equal to a desired polarization so as to reduce SBS.

In yet another embodiment, there is provided a method for reducing SBS, comprising: a master oscillator (MO) configured to generate a beam; a beam splitter configured to receive the beam from the MO and to split it into a plurality of beams; a birefringent element configured to receive the beams from the beam splitter and to transmit the beams, wherein at least one of the plurality of beams is transmitted with a transmission delay between two orthogonal axes; a polarization controller configured to receive the beams and to transmit the beams with desired polarizations; a fiber amplifier configured to receive the beams from the polarization controller, to amplify the beams, and to transmit the beams; a combiner configured to receive the beams from the fiber amplifier, to combine the plurality of beams into an integrated output beam, and to transmit the output beam; a compensating birefringent element configured to receive the output beam from the combiner, to approximately remove the transmission delay, and to transmit the output beam; a polarization detector configured to detect the polarization of the output beam; and a polarization processor configured to provide feedback to the polarization controller; generating a beam using the MO; and controlling the polarization of the output beam using the plurality of polarization controllers to ensure that the polarizations of the output beams are approximately equal to a desired output polarization, so as to reduce SBS.

DESCRIPTION OF THE DRAWINGS

The accompanying drawings provide visual representations which will be used to more fully describe various representative embodiments and can be used by those skilled in the art to better understand the representative embodiments disclosed herein and their inherent advantages. In these drawings, like reference numerals identify corresponding elements.

DETAILED DESCRIPTION

Figure 1:
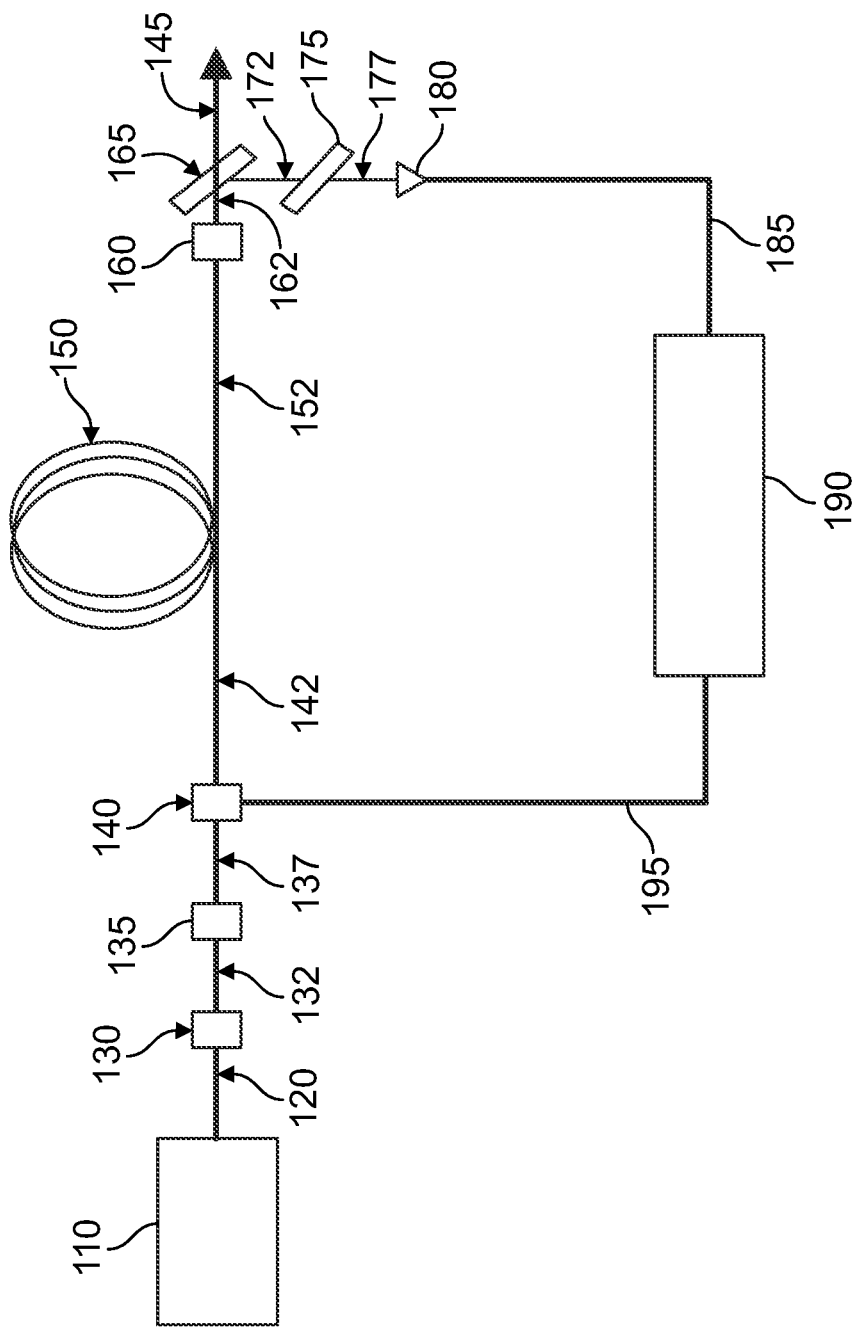
FIG. 1 is a schematic drawing of an apparatus for suppression of SBS using polarization control with a birefringent delay element in a fiber amplifier beam combination system.

While the present invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described. In the following description and in the several figures of the drawings, like reference numerals are used to describe the same, similar or corresponding parts in the several views of the drawings.

Polarization maintaining (PM) fibers are employed in many applications, including high power fiber amplifiers, with light launched along one of the principal birefringent axes so that thermal and mechanical variations do not alter the output polarization state. Use of PM fibers may be impractical or undesirable for certain applications. In such cases, high power fiber amplifiers may have very small or no birefringence, for example, birefringence less than or equal to approximate $1 \times 10^{-5}$. Suppression of stimulated Brillouin scattering (SBS) in such low birefringence fiber amplifiers may be desirable. SBS can be suppressed in such situations by use of completely unpolarized light.

However, the propagation of unpolarized light through a high power fiber amplifier further scrambles the polarization state of the output beam because of residual birefringence in the fiber. This residual birefringence can be attributed to one or more of intrinsic properties, thermal properties, and stress. Coherent and spectral beam combination methods require that the output beam have a polarization state capable of being precisely controlled, which is difficult according to the current state of the art. Therefore, the use of completely unpolarized light in a beam combination system is problematic for both coherent and spectral combination.

According to embodiments of the invention, unpolarized light can be propagated through a fiber amplifier with the ability to control the polarization state of the output beam with a high degree of precision. Embodiments of the invention allow the SBS threshold to be increased by a factor of approximately two using one or more of coherent and spectral combination techniques. The beam from the MO may be split into components, phase modulated as needed to control coherent combination and then depolarized using a birefringent delay element. For example, for at least one component, the birefringent element may delay the transmission along one orthogonal polarization axis of approximately 50% of the total power of that component. Preferably, the delay time is greater than the coherence time of the beam.

As a result, the depolarized light sees a reduced amount of gain attributed to SBS in the fiber amplifier, due to the negligible interaction of the orthogonally polarized components, which will typically have approximately equal power. After the fiber amplifier, a compensating birefringent delay element then may reconstruct the initial polarization of the MO source. The reconstructed polarization may be sensed and optimized by a standard polarization control circuit which feeds error signals back to a polarization controller positioned at the input to the fiber amplifier.

According to embodiments of the invention, suppression of SBS may thereby be achieved in low birefringence fiber amplifiers without a requirement of completely unpolarized light. Moreover, embodiments of the invention permit polarization control of the fiber outputs, using one or more of coherent and spectral combination architectures. As a result, embodiments of the invention allow one or more of spectral and coherent combination methods to be implemented at a higher power from the constituent fibers than would otherwise be practicable. The improvement in power while controlling SBS pursuant to embodiments of the invention amounts to at least approximately a factor of two.

According to embodiments of the invention, multiple fiber amplifiers may be seeded by a common master oscillator (MO) of an appropriately chosen bandwidth for stimulated Brillouin scattering (SBS) control. For example, a single frequency laser may be used whose beam is broadened by phase modulation. Alternatively, the MO may be intrinsically broad.

The birefringent element may comprise PM fiber whose PM axes are positioned at approximately a 45 degree angle to the polarization of the input beam. Other examples of birefringent elements include birefringent crystals and a polarizing Mach-Zehnder interferometer.

According to embodiments of the invention, a useful delay period may be a time period greater than the coherence time of the beam. Under normal conditions, the coherence time is approximately equal to the inverse of the bandwidth. As a result of the delay, the polarizations of the light along the two orthogonal axes are uncorrelated.

Each beam may have a piston phase modulator to adjust the beam's piston phase for optimal coherent combination. The piston phase modulator may accept an unpolarized input beam. A broadening phase modulator may be used to increase the beam's bandwidth by externally broadening the beam.

Alternatively, if needed, for example, if piston phase modulators require polarized light, according to embodiments of the invention, a plurality of birefringent elements having approximately equal characteristic delay times may be positioned in series between the corresponding piston phase modulator and the corresponding polarization controller.

According to embodiments of the invention, the resulting beam may seed a number of fiber amplifiers. The fiber amplifiers may comprise multiple stages to increase the output power to a desired level. The fiber amplifiers may comprise one or more low power amplifier stages. The fiber amplifiers may comprise one or more high power amplifier stages. The amplifier stages may be separated by optical isolators to prevent feedback and backward oscillation.

A compensating birefringent element may be used to compensate for the delay imposed between the two polarization modes by the birefringent element. Because use in the compensating birefringent element of a long length of PM fiber with a high power beam has the potential for introducing an additional source of SBS, such a use may reduce the level of reduction of SBS available pursuant to embodiments of the invention.

Alternatively the birefringent element may compensate the delay in a low power sample of the amplified beam. In this case a long length of PM fiber can be used as the birefringent element in the low power beam sample without the potential for additional SBS.

According to embodiments of the invention, a polarization detector may be positioned after the birefringent element at the output of the fiber amplifiers. Using feedback from the polarization detector, a polarization processor may be employed to ensure that the polarizations of the output beams are approximately equal to a desired output polarization and accordingly, are approximately equal to each other. The SBS threshold of the fiber amplifier may be thereby increased by a factor of up to approximately two.

FIG. 1 is a schematic drawing of an apparatus for suppression of SBS using polarization control with a low birefringence fiber amplifier beam combination system.

In FIG. 1, a master oscillator (MO) 110 of appropriate spectral characteristics generates a signal 120 or input beam 120, preferably an input beam 120 of low power seed light.

The MO is preferably a frequency broadened MO. The MO may be externally broadened by a broadening phase modulator.

In FIG. 1, the input beam 120 passes through a piston phase modulator 130 that has the ability to transform the piston phase of input beam 120 into any arbitrary phase of modulated beam 132. The piston phase modulator 130 varies the beam's piston phase as needed to control coherent combination. Next the modulated beam 132 passes through a birefringent element 135 that delays the transmission along one orthogonal polarization axis of approximately 50% of the total power of modulated beam 132. The delay time is preferably at least approximately equal to or greater than the coherence time of the input beam 120. Under normal conditions, the coherence time is approximately equal to the inverse of the bandwidth. As a result, the polarizations of these orthogonally-delayed beam components along the two orthogonal axes are uncorrelated, and the resulting orthogonally-delayed beam 137 will be approximately unpolarized.

Next the orthogonally-delayed and unpolarized beam 137 passes through a polarization controller 140 and through other components discussed below before emerging as output beam 145. The polarization controller 140 has the ability to transform any arbitrary state of polarization of orthogonally-delayed beam 137 into a desired state of polarization of polarization-controlled beam 142. The polarization controller 140 adjusts the polarization of the polarization-controlled beam 142, to ensure that the polarization of the output beam 145 is approximately equal to a desired polarization. The SBS threshold of the fiber amplifier may be thereby increased by a factor of up to approximately two.

Next the polarization-controlled beam 142 passes through a fiber amplifier 150. Preferably, the fiber amplifier 150 comprises fiber that is non-PM fiber. The fiber amplifier 150 may comprise active fiber. The fiber amplifier 150 may comprise passive fiber. The fiber amplifier 150 preferably uses fiber of low birefringence, for example less than or equal to approximately $1 \times 10^{-5}$.

After the fiber amplifier 150, the amplified beam 152 passes through a compensating birefringent element 160 and then through a beam sampler 165 before emerging as the output beam 145. Compensating birefringent element 160 approximately undoes the delay introduced by birefringent element 135, removing the delay between the two orthogonal polarization axes of the orthogonally-delayed components of compensated beam 162.

Beam sampler 165 samples the output beam 145, transmitting a high power output beam and reflecting a low power beam 172 that is directed to polarizing filter 175. The polarizing filter 175 receives the low power beam 172 from the beam sampler 165 and filters it, transmitting a polarized beam 177 with the desired output polarization to a polarization detector 180 and reflecting light (not shown) with a polarization other than the desired output polarization away from the polarization detector 180. The axes of polarizing filter 175 is preferably oriented at an angle of approximately 45° with respect to the polarization axes of compensating birefringent element 160. The polarizing filter 175 may also introduce a phase shift between polarizations such that the polarizations of the sampled beam 172 and of the output beam 145 can be controlled to have desired polarization states.

The polarization detector 180 detects the power of the desired polarization state of the polarized beam 177 transmitted by the polarization filter 175 in the form of polarization feedback 185 to a polarization processor 190 regarding the polarization of the sampled beam 172 and output beam 145. Preferably, the polarization feedback 185 may be in the form of a polarization error signal 185. Set up as described, the polarization processor 190 directs the minimization (or maximization) of the polarization error signal 185 by sending appropriate polarization instructions 195 to the polarization controller 140.

A feedback control loop within the polarization processor 190 instructs the polarization controller 140 to adjust the polarization of output beam 145 to minimize (or maximize) the polarization error signal 185, ensuring that the polarization of the output beam 145 is approximately equal to a desired polarization. Desired polarizations may include, as examples, linear polarization, circular polarization, and elliptical polarization, although many other desired polarizations are possible. This yields an improvement by a factor of approximately two in the SBS threshold.

This invention enables approximately two times higher laser power scaling by combination of high power fiber lasers. These lasers are now limited in power by SBS, which can be diminished by the technique described, thereby enabling more power from the system than would otherwise be possible. This set of embodiments enables the output beams from many independent fibers to be approximately identically polarized by the disclosed polarization control methods.

Figure 2:
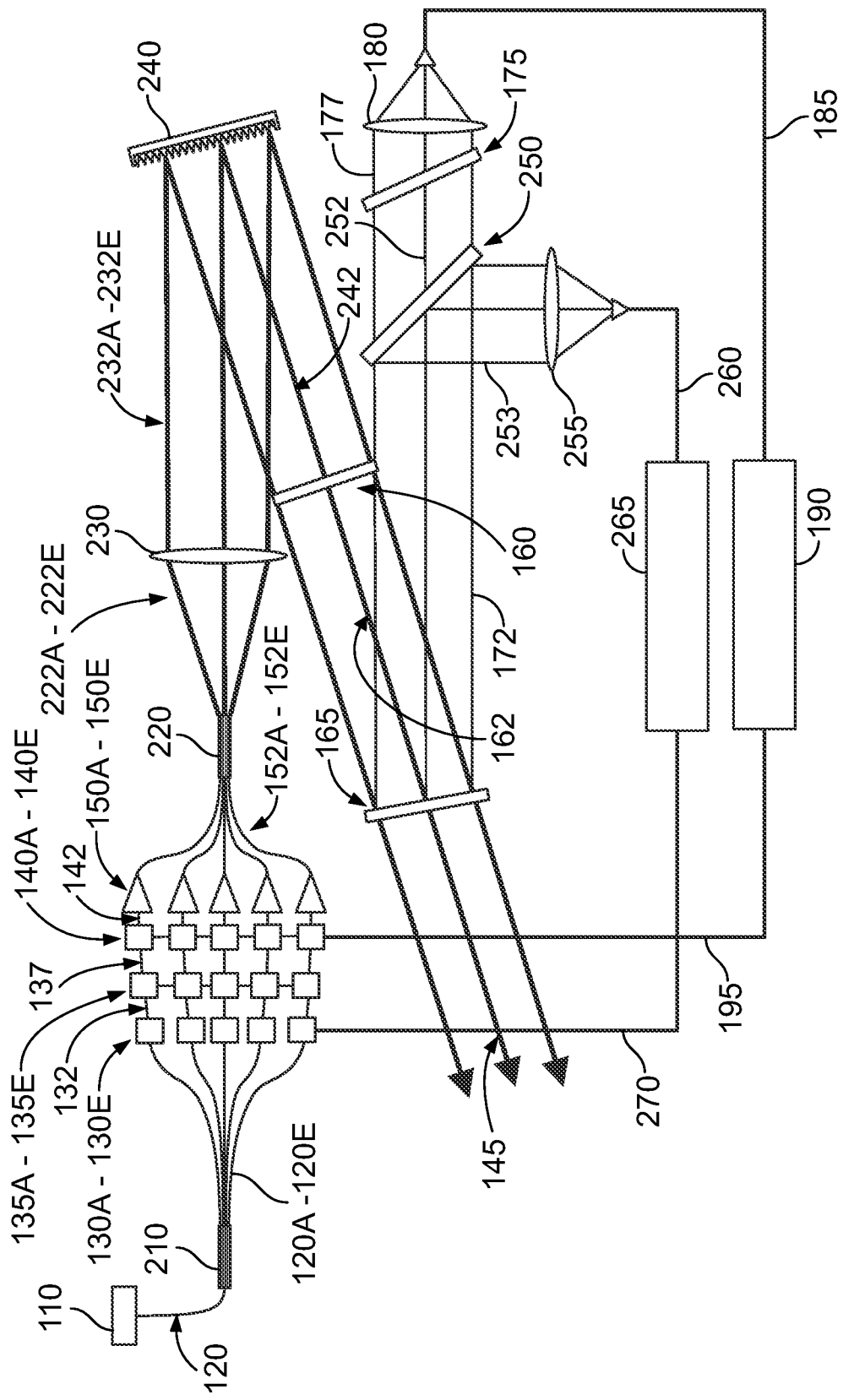
FIG. 2 is a drawing of an apparatus for suppression of SBS using polarization control and phase control with a birefringent delay element located after a splitter and a compensating birefringent delay element located in the high power output beam in a coherent signal combination architecture.
Figure 3:
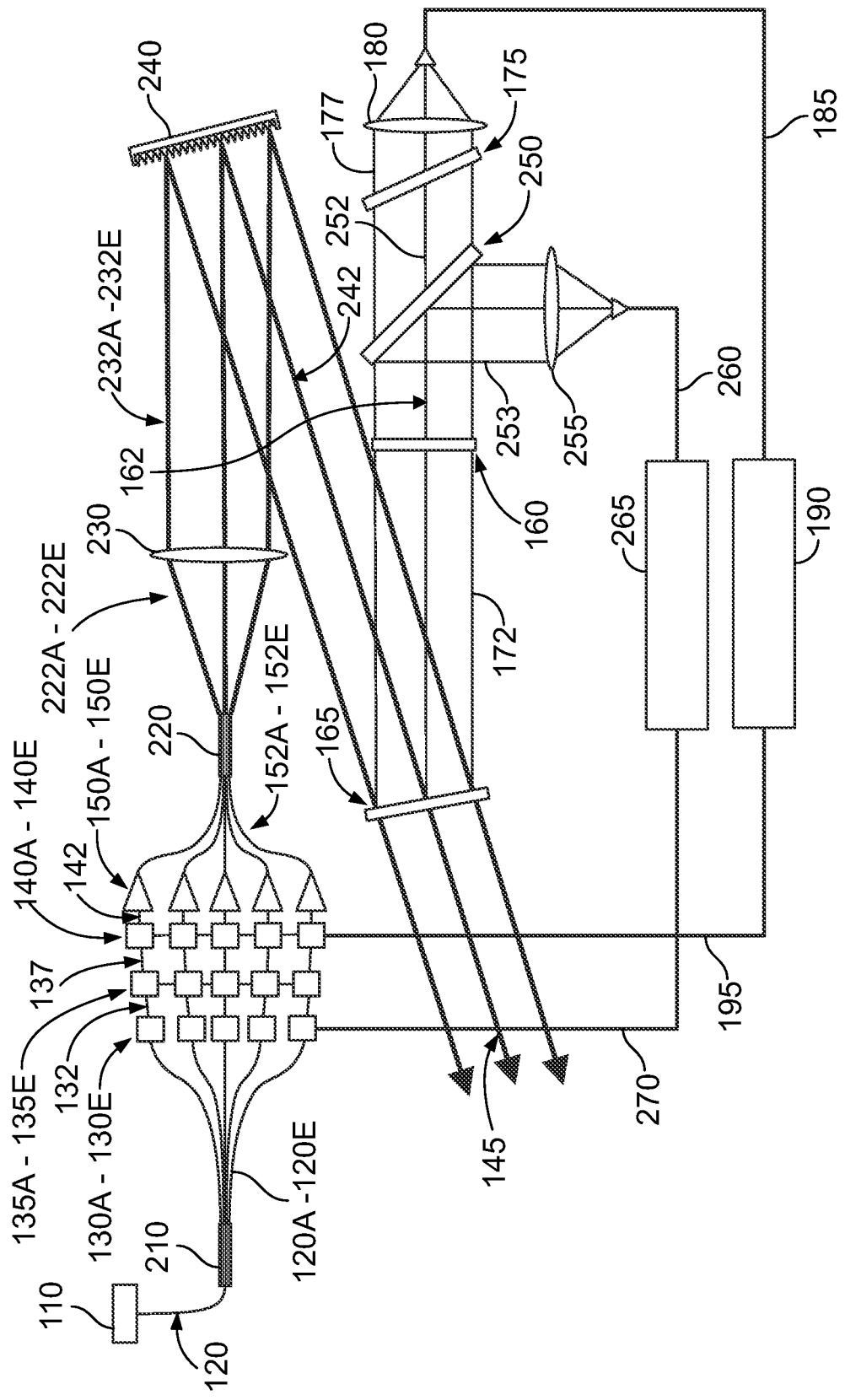
FIG. 3 is a drawing of an apparatus for suppression of SBS using elliptical polarization control and phase control with a birefringent delay element located after a splitter and a compensating birefringent delay element located in the low power sample beam in a coherent signal combination architecture.
Figure 4:
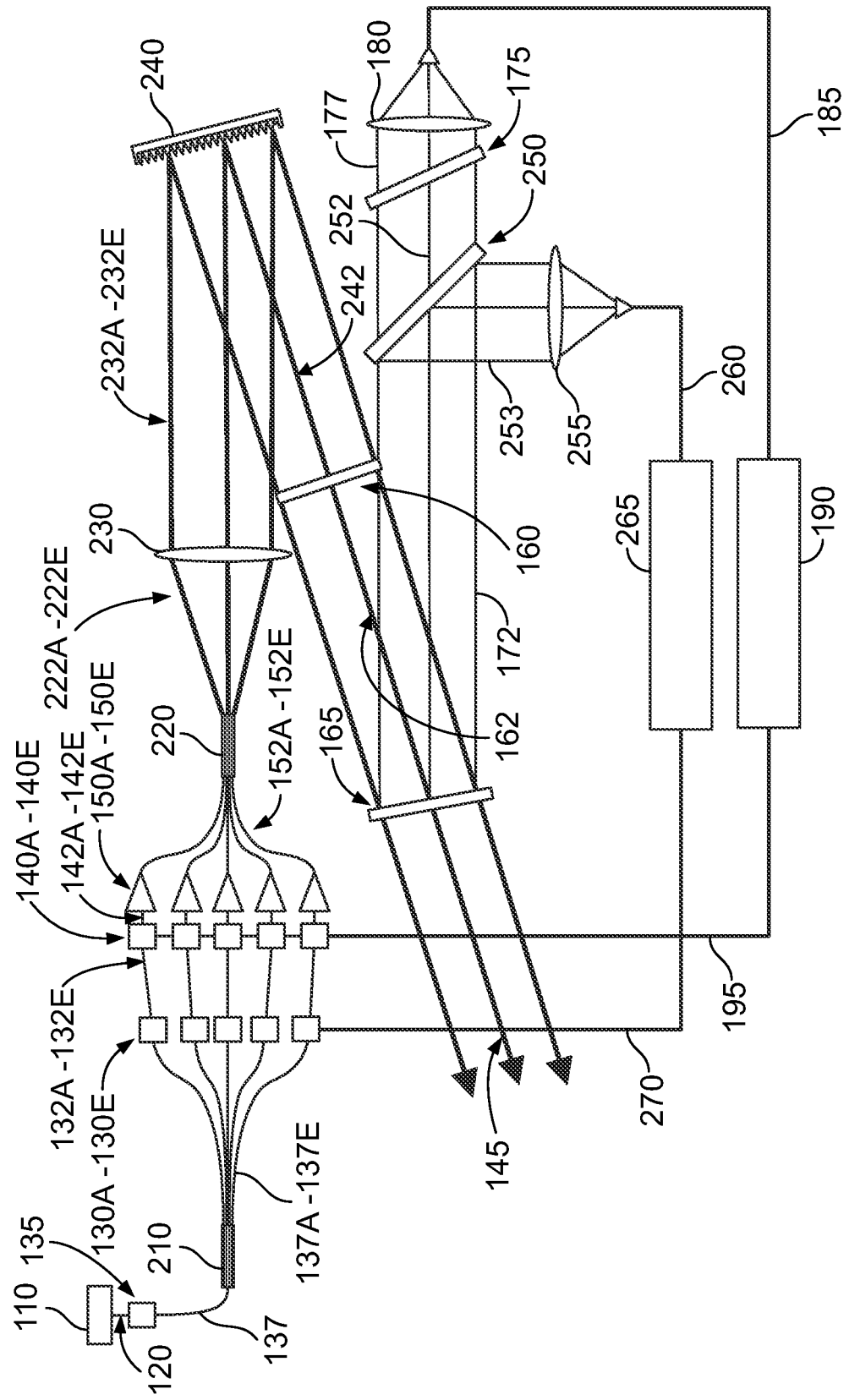
FIG. 4 is a drawing of an apparatus for suppression of SBS using polarization control and phase control with a birefringent delay element located in front of a splitter and a compensating birefringent delay element located in the high power output beam in a coherent signal combination architecture.
Figure 5:
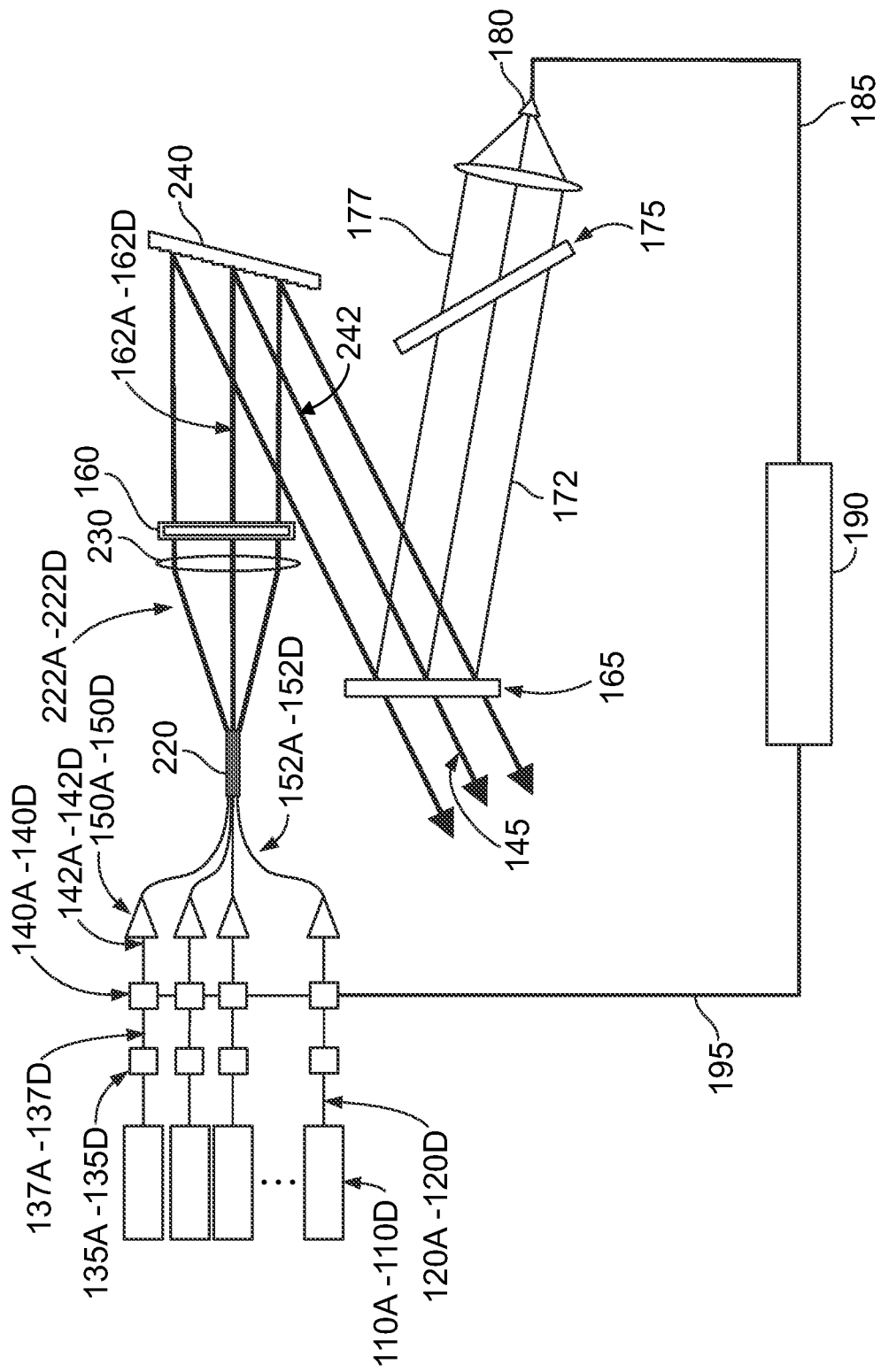
FIG. 5 is a drawing of an apparatus for suppression of SBS using polarization control with a birefringent delay element in a fiber amplifier beam combination system in a spectral signal combination architecture.

FIGS. 2-5 illustrate different embodiments of the invention using spectral or coherent combination architectures, different possible desired polarizations, and different respective positions for some elements of the apparatus. While a linear output polarization is often preferred for suppression of SBS, there may be some applications in which an elliptically polarized output is preferred, as shown below in FIG. 3. FIGS. 2-4 illustrate different embodiments with coherent combination architectures, while FIG. 5 illustrates an embodiment with spectral combination architecture.

The compensating birefringent element 160 can be placed directly in the path of the output beam 145, as shown below for example in FIG. 2 and FIGS. 4-5. The component input beams 120A-120E are then each amplified to the desired power level and combined either coherently (FIGS. 2-4) or spectrally (FIG. 5). Alternatively, as shown below in FIG. 3, the compensating birefringent element 160 can be positioned in a low power sample 172 of the combined output beam, so that each output has a polarization approximately equal to the polarization of the other outputs.

The combined output beam 145 is sampled to sense the polarization of the component collimated beams 232A-232E. The polarization of the output beam 145 can be controlled according to embodiments of the invention so that the polarization is approximately equal to a desired output polarization for one or more of the component output beams comprised in output beam 145. For coherent combination applications, such as the examples shown below in FIGS. 2-4, a second sample of the output beam 145 can be used for sensing the phase of the component collimated beams 232A-232E and for phase-locking control.

FIG. 2 is a drawing of an apparatus for suppression of SBS with a fiber amplification system using polarization control and phase control. Birefringent delay elements are located after a splitter and a compensating birefringent delay element is located in the high power output beam. The system uses a coherent signal combination architecture and employs a diffractive optical element (DOE) as a combiner.

An MO 110 of appropriate spectral characteristics generates an input beam 120, preferably an input beam 120 of low power seed light. The MO is preferably a frequency broadened MO. Alternatively, the MO may be single frequency and externally broadened by one or more broadening phase modulators.

The input beam 120 passes through a beam splitter 210 that divides the input beam 120 into a plurality of component input beams 120A-120E. Component input beams 120A-120E pass through respective piston phase modulators 130A-130E. The one or more piston phase modulators 130A-130E have the ability to transform the piston phases of respective component input beams 120A-120E into any arbitrary phases in the resulting component modulated beams 132A-132E. One or more of component modulated beams 132A-132E has its piston phase adjusted by one of the respective piston phase modulators 130A-130E as needed to control coherent combination in the output beam 145.

Next component modulated beams 132A-132E pass through respective birefringent elements 135A-135E, which, for at least one of the component modulated beams 132A-132E, delays the transmission of approximately 50% of the total power of that component along one orthogonal polarization axis. The delay time is preferably at least approximately equal to or greater than the coherence time of the input beam 120. As a result, the polarizations of the light along the two orthogonal axes are uncorrelated for the resulting component transmission-delayed beams 137A-137E, and accordingly the component transmission-delayed beams 137A-137E are approximately unpolarized.

Next, the component transmission-delayed beams 137A-137E pass through respective polarization controllers 140A-140E and through other components discussed below before emerging as output beam 145. The polarization controllers 140A-140E have the ability to transform any arbitrary state of polarization of respective component transmission-delayed beams 137A-137E into any arbitrary state of polarization of component polarization-controlled beams 142A-142E. At least one polarization controller 140A-140E adjusts the polarization of at least one of the respective component transmission-delayed beams 137A-137E, thereby generating respective component polarization-controlled beams 142A-142E, to ensure that the polarizations of the respective components of output beam 145 are approximately equal to a desired polarization. In this example, the desired polarization is linear polarization. Alternatively, the polarization of output beam 145 may be any polarization state such as circular or elliptical.

After passing through respective polarization controllers 140A-140E, the component controlled beams 142A-142E then pass through respective fiber amplifiers 150A-150E. Preferably, amplifiers 150A-150E comprise fiber that is non-PM fiber. The amplifiers 150A-150E may comprise active fiber. The amplifiers 150A-150E may comprise passive fiber. The amplifiers 150A-150E preferably comprise optical fiber having low birefringence, for example, birefringence less than or equal to approximately $1 \times 10^{-5}$.

Amplifiers 150A-150E amplify at least one of the component controlled beams 142A-142E to the respective desired power levels, producing component amplified beams 152A-152E. The resulting component amplified beams 152A-152E are then recombined coherently, assembled, and sent into an appropriately spaced fiber array 220, which generates component assembled beams 222A-222E.

The component assembled beams 222A-222E transmitted by the fiber array 220 then pass through collimating optic 230, which collimates the component assembled beams 222A-222E, producing component collimated beams 232A-232E, and directs the component collimated beams 232A-232E onto combiner 240 at the appropriate angles of incidence where they are coherently combined into a single combined beam 242.

Combined beam 242 is next directed to compensating birefringent element 160. Compensating birefringent element 160 again approximately undoes the delay introduced by the birefringent elements 135A-135E, removing the transmission delay between the two orthogonal polarization axes of the transmission-delayed components of combined beam 242, and generating a compensated beam 162. After passing through compensating birefringent element 160, the compensated beam 162 passes through beam sampler 165 and then emerges as output beam 145.

Beam sampler 165 provides a sample of the output beam 145, transmitting a high power output beam 145 and reflecting a low power sample beam 172 that is directed toward auxiliary beam sampler 250. Auxiliary beam sampler 250 samples the low power beam 172, transmitting a first portion 252 of the low power beam 172 to polarizing filter 175 and on to polarization detector 180, and reflecting a second portion 253 of the low power beam 172 to phase detector 255.

The polarizing filter 175 receives the first beam portion 252 from the auxiliary beam sampler 250 and filters it, transmitting a polarized beam 177 with the desired output polarization to the polarization detector 180 and reflecting light (not shown) with a polarization other than the desired output polarization away from the polarization detector 180. According to embodiments of the invention, the polarizing filter 175 is preferably oriented at an angle of approximately 45° with respect to the polarization axes of the compensating birefringent element 160.

Phase detector 255 detects the phases of component beams comprised in second beam portion 253 and thereby detects the phases of component output beams 145. Then phase detector 255 transmits output in the form of phase feedback 260 to a phase processor 265 which transmits phase instructions 270 to the piston phase modulators 130A-130E based on the phases of the component output beams 145. Preferably, the phase feedback 260 may be in the form of a phase error signal 260. Phase feedback control loops within the phase processor 265 generate appropriate phase instructions 270. Following phase instructions 270, piston phase modulators 130A-130E adjust the phase of component output beams 145 to minimize (or maximize) the phase error signal 260.

As above, polarization detector 180 detects the polarization state of the component output beams 145 and transmits output in the form of polarization feedback 185 to a polarization processor 190 which transmits polarization instructions 195 to the polarization controllers 140A-140E based on the polarization feedback 185. Preferably, the polarization feedback 185 may be in the form of a polarization error signal 185.

Following polarization instructions 195, polarization modulators 140A-140E adjust the polarization of component output beams 145 to minimize (or maximize) the polarization error signal 185. The polarization feedback 185 and the polarization feedback control loop within the polarization processor 190 ensure that the polarization controllers 140A-140E adjust the polarization of the component output beams 145 so that they are approximately equal to the desired output polarization, yielding effective beam combination and an improvement by a factor of approximately two in the SBS threshold.

FIG. 3 is a drawing of an apparatus for suppression of SBS with a fiber amplification system using polarization control and phase control. Birefringent delay elements 135A-135E are located after splitter 210. Differently from in FIG. 2, the compensating birefringent element 160 is not positioned in the path of the output beam 145 emerging from combiner 240. Instead, the compensating birefringent element 160 is positioned in the path of the low power sample beam 172 reflected by beam sampler 165. The system uses a coherent signal combination architecture and employs a diffractive optical element (DOE) 240 as a combiner 240.

An MO 110 of appropriate spectral characteristics generates an input beam 120, preferably an input beam 120 of low power seed light. The MO is preferably a frequency broadened MO. Alternatively, the MO may be single frequency and externally broadened by a broadening phase modulator.

The input beam 120 passes through a beam splitter 210 that divides the input beam 120 into a plurality of component input beams 120A-120E. Component input beams 120A-120E again pass through respective piston phase modulators 130A-130E, which have the ability to transform the piston phases of respective component input beams 120A-120E into any arbitrary phases in the resulting component modulated beams 132A-132E. One or more of component modulated beams 132A-132E has its piston phase adjusted by one of the respective piston phase modulators 130A-130E as needed to control coherent combination.

Next component modulated beams 132A-132E pass through respective birefringent elements 135A-135E, which, for at least one of the component modulated beams 132A-132E, delays the transmission of approximately 50% of the total power of that component along one orthogonal polarization axis. The delay time is preferably at least approximately equal to or greater than the coherence time of the input beam 120. As a result, the polarizations of the light along the two orthogonal axes are again uncorrelated for the resulting component transmission-delayed beams 137A-137E.

Next, the component transmission-delayed beams 137A-137E again pass through respective polarization controllers 140A-140E and through other components including amplifiers 150A-150E, fiber array 220, collimating optic 230, combiner 240, and beam sampler 165, before emerging as output beam 145. At least one polarization controller 140A-140E adjusts the polarization of at least one respective component transmission-delayed beam 137A-137E, thereby generating component controlled beams 142A-142E, to ensure that the polarizations of the components of output beam 145 are approximately equal to the desired elliptical polarization.

The component controlled beams 142A-142E then pass through respective fiber amplifiers 150A-150E, at least one of which amplifies the respective component controlled beams 142A-142E to the respective desired power levels, again producing component amplified beams 152A-152E. Preferably, fiber amplifiers 150A-150E comprise fiber that is non-PM fiber. The fiber amplifiers 150A-150E may comprise active fiber. The fiber amplifiers 150A-150E may comprise passive fiber. The fiber amplifiers 150A-150E preferably comprise optical fiber having low birefringence, for example, birefringence less than or equal to approximately $3.5 \times 10^{-5}$. Again, the resulting component amplified beams 152A-152E are then recombined coherently, assembled, and sent into appropriately spaced fiber array 220, which generates component assembled beams 222A-222E.

After the fiber array 220, the component assembled beams 222A-222E again pass through collimating optic 230, which collimates the component assembled beams 222A-222E, producing component collimated beams 232A-232E, and directs the component collimated beams 232A-232E onto combiner 240 at the appropriate angles of incidence where they are coherently combined into combined beam 242.

Next combined beam 242 passes through beam sampler 165 and then emerges. Beam sampler 165 samples the combined beam 242, transmitting a high power output beam 145 and reflecting a low power beam 172 that is directed to compensating birefringent element 160. Compensating birefringent element 160 approximately undoes the delay introduced by the birefringent elements 135A-135E, removing the transmission delay between the two orthogonal polarization axes of the transmission-delayed components of low power beam 172, and generating compensated beam 162.

After passing through compensating birefringent element 160, the compensated beam 162 passes through auxiliary beam sampler 250. Auxiliary beam sampler 250 samples the compensated beam 162, transmitting the first portion 252 of the compensated beam 162 to polarizing filter 175 and on to polarization detector 180, and reflecting the second portion 253 of the low power beam 172 to phase detector 255.

The polarizing filter 175 receives the first beam portion 252 from the auxiliary beam sampler 250 and filters it, transmitting a polarized beam 177 with the desired output polarization to the polarization detector 180 and reflecting light (not shown) with a polarization other than the desired output polarization away from the polarization detector 180. According to embodiments of the invention, the polarizing filter 175 is preferably oriented at an angle of approximately 45° with respect to the polarization axes of the compensating birefringent element 160.

Phase detector 255 detects the phase of second beam portion 253 and thereby detects the phase of the output beam 145. Then phase detector 255 transmits output in the form of phase feedback 260 to a phase processor 265 which transmits phase instructions 270 to the piston phase modulators 130A-130E based on the phase of the output beam 145. Preferably, the phase feedback 260 may be in the form of a phase error signal 260. Phase feedback control loops within the phase processor 265 generate appropriate phase instructions 270. Following phase instructions 270, piston phase modulators 130A-130E adjust the phase of output beam 145 to minimize (or maximize) the phase error signal 260.

As above, polarization detector 180 detects the polarization state of the output beam 145 and transmits output in the form of polarization feedback 185 to a polarization processor 190 which transmits polarization instructions 195 to the polarization controllers 140A-140E based on the polarization feedback 185. Preferably, the polarization feedback 185 may be in the form of a polarization error signal 185.

Following polarization instructions 195, polarization modulators 140A-140E adjust the polarization of output beam 145 to minimize (or maximize) the polarization error signal 185. The polarization feedback 185 and the polarization feedback control loop within the polarization processor 190 ensure that the polarization controllers 140A-140E adjusts the polarization of the output beam 145 so that it is approximately equal to a desired output polarization, yielding an improvement by a factor of approximately two in the SBS threshold.

Analogous to the example shown in FIG. 2, for the low power portion of the beam 172 that is transmitted, compensating birefringent element 160 approximately undoes the delay introduced by the birefringent elements 135A-135E, removing the transmission delay between the two orthogonal polarization axes of component beams in the low power portion of the beam 172 and the output beam 145. In this case, however, since compensating birefringent element 160 does not act on the full output beam 145, the polarizations of the component beams in output beam 145 are approximately equal, but unpolarized. The polarizations of the component beams in output beam 145 are approximately unpolarized rather than the linear or otherwise controlled polarization state shown in FIG. 2.

Another example according to embodiments of the invention is shown in FIG. 4. In this embodiment, a single birefringent element 135 following the MO provides the time delay and depolarization for all the amplifier chains. Accordingly, beam 120 comprises unpolarized light. The unpolarized signal is split and then phase and polarization controlled as described previously. In this embodiment, the input to the piston phase modulators 130A-130E is unpolarized and thus piston phase modulators 130A-130E that can operate in this mode are required for this embodiment.

FIG. 4 is a drawing of an apparatus for suppression of SBS with a fiber amplification system using polarization control and phase control. Differently from in FIG. 2, a single birefringent delay element is positioned before the splitter. Differently from in FIG. 3, the compensating birefringent delay element 160 is positioned in the path of the combined beam 242 emerging from combiner 240. The system uses a coherent signal combination architecture and employs a diffractive optical element (DOE) 240 to form combined beam 242.

An MO 110 of appropriate spectral characteristics generates an input beam 120, preferably an input beam 120 of low power seed light. The MO is preferably a frequency broadened MO.

The input beam 120 passes through a birefringent element 135, which again delays the transmission of approximately 50% of the total power of input beam 120 along one orthogonal polarization axis. The delay time is preferably at least approximately equal to or greater than the coherence time of the input beam 120. As a result, the polarizations of the light along the two orthogonal axes are again uncorrelated for the transmission-delayed beam 137.

Next the transmission-delayed beam 137 passes through beam splitter 210, which divides the transmission-delayed 137 into a plurality of component transmission-delayed beams 137A-137E. Component transmission-delayed beams 137A-137E then pass through respective piston phase modulators 130A-130E, which transform the piston phases of respective component transmission-delayed beams 137A-137E into any arbitrary phases in the resulting component modulated beams 132A-132E. One or more of component modulated beams 132A-132E has its piston phase adjusted by one of the respective piston phase modulators 130A-130E as needed to control coherent combination in the output beam 145.

Next, component modulated beams 132A-132E again pass through respective polarization controllers 140A-140E and through other components including amplifiers 150A-150E, fiber array 220, collimating optic 230, combiner 240, compensating birefringent element 160, and beam sampler 165, before emerging as output beam 145. At least one polarization controller 140A-140E adjusts the polarization of at least one respective component modulated beam 132A-132E, thereby generating component controlled beams 142A-142E, to ensure that the polarizations of the components of output beam 145 are approximately equal to the desired linear polarization.

The component controlled beams 142A-142E then pass through respective fiber amplifiers 220A-220E, which again amplify at least one of the respective component controlled beams 142A-142E to the respective desired power levels, again generating component amplified beams 152A-152E.

Preferably, fiber amplifiers 150A-150E comprise fiber that is non-PM fiber. The fiber amplifiers 150A-150E may comprise active fiber. The fiber amplifiers 150A-150E may comprise passive fiber. The fiber amplifiers 150A-150E preferably comprise optical fiber having low birefringence, for example, birefringence less than or equal to approximately $1 \times 10^{-5}$. The outputs of the fiber amplifier 150 are assembled into an appropriately spaced array.

The resulting component amplified beams 152A-152E are again recombined coherently, assembled, and sent into appropriately spaced fiber array 220, which generates component assembled beams 222A-222E.

After the fiber array 220, the component assembled beams 222A-222E again pass through collimating optic 230, which collimates the component assembled beams 222A-222E, producing component collimated beams 232A-232E, and directs the component collimated beams 232A-232E onto combiner 240 at the appropriate angles of incidence where they are coherently combined into combined beam 242.

Then the combined beam 242 is directed to compensating birefringent element 160. Compensating birefringent element 160 approximately undoes the delay introduced by the birefringent elements 135A-135E, removing the transmission delay between the two orthogonal polarization axes of combined beam 242 and generating compensated beam 162. After passing through compensating birefringent element 160, the compensated beam 162 passes through beam sampler 165 and then emerges as output beam 145.

Beam sampler 165 samples the output beam 145, transmitting a high power output beam 145 and reflecting a low power beam 172 that is directed toward auxiliary beam sampler 250. Auxiliary beam sampler 250 samples the low power beam 172, transmitting a first portion 252 of the low power beam 172 to polarizing filter 175 and on to polarization detector 180, and reflecting a second portion 253 of the low power beam 172 to phase detector 255.

The polarizing filter 175 receives the first beam portion 252 from the auxiliary beam sampler 250 and filters it, transmitting a polarized beam 177 with the desired output polarization to the polarization detector 180 and reflecting light (not shown) with a polarization other than the desired output polarization away from the polarization detector 180. According to embodiments of the invention, the polarizing filter 175 is preferably oriented at an angle of approximately 45° with respect to the polarization axes of the birefringent elements 135A-135E.

Phase detector 255 detects the phases of component beams comprised in second beam portion 253 and thereby detects the phases of component output beams 145. Then phase detector 255 transmits output in the form of phase feedback 260 to a phase processor 265 which transmits phase instructions 270 to the piston phase modulators 130A-130E based on the phase of the component output beams 145. Preferably, the phase feedback 260 may be in the form of a phase error signal 260. Phase feedback control loops within the phase processor 265 generate appropriate phase instructions 270. Following phase instructions 270, piston phase modulators 130A-130E adjust the phase of output beam 145 to minimize (or maximize) the phase error signal 260.

As above, polarization detector 180 detects the polarization state of the component output beams 145 and transmits output in the form of polarization feedback 185 to a polarization processor 190 which transmits polarization instructions 195 to the polarization controllers 140A-140E based on the polarization feedback 185. Preferably, the polarization feedback 185 may be in the form of a polarization error signal 185.

Following polarization instructions 195, polarization modulators 140A-140E adjust the polarization of component output beams 145 to minimize (or maximize) the polarization error signal 185. The polarization feedback 185 and the polarization feedback control loop within the polarization processor 190 ensure that the polarization controllers 140A-140E adjust the polarization of the output beam 145 so that they are approximately equal to the desired linear output polarization, yielding an improvement by a factor of approximately two in the SBS threshold.

Alternatively, the compensating birefringent element 160 may be positioned in the path of the low power sample beam 172, in analogy to the example shown in FIG. 3. In that case (not shown), for the low power portion 172 of the beam that it sees, compensating birefringent element 160 approximately undoes the delay introduced by the birefringent element 135, removing the transmission delay between the two orthogonal polarization axes of component beams in the low power beam 172. Since in that case, compensating birefringent element 160 does not act on the full output beam 145, the resulting polarization of the output beams is approximately unpolarized rather than controlled as in FIG. 2 and FIG. 4 as shown.

Alternative embodiments of the invention may be used with a spectral beam combining (SBC) architecture, such as is shown in FIG. 5. FIG. 5 is a drawing of an apparatus for suppression of SBS with a high power fiber amplification system using polarization control pursuant to a spectral beam combination architecture and employing a grating as a combiner.

According to embodiments of the invention, similar advantages in suppressing SBS can be achieved in a spectral combination system as in a coherent combination system by use of birefringent elements 135A-135D in conjunction with compensating birefringent element 160. In the SBC architecture, each MO operates at a distinct wavelength, and thus a birefringent element is required in the low power section of each beam to provide time delays that will be corrected by the compensating birefringent filter in the combined output beam. However, phase control is not needed for SBC, and thus only a single sampled beam and polarization detector is needed to feed back and control the polarization at the desired orientation with respect to the principal birefringent axes of the PM fiber segment. Although FIG. 5 depicts a polarizing filter 175, because the gratings used in this architecture are generally fairly polarizing, it may be that the filter may not in fact be needed in some configurations. The system employs a diffraction grating 240 to spectrally combine constituent beams into a combined beam 242.

If the birefringent elements 135A-135D are all identical then any variation in generated delay owing to the variation in wavelengths between beams will be precisely compensated. However, if different types of birefringent elements 135A-135D are used to generate and compensate the delays, then one must ensure that the delays are compensated by the compensating birefringent element 160 to an accuracy much less than the coherence time of the beam 120, such that a high degree of polarization in the controlled output of each beam can be achieved. Alternatively, the compensating birefringent element 160 may also be placed in the path of the low power sample beam 172, in analogy with FIG. 3, rather than directly in the path of the output beam 145. However, since in the SBC architecture one generally desires a specific linear state of polarization to be incident on the grating 240, each wavelength in the beam 120 may require an individual polarization detector that maximizes an arbitrary elliptical state such that after passing through the birefringent elements 135A-135D, each component beam has the desired linear polarization at the grating 240.

In FIG. 5, an MO 110 of appropriate spectral characteristics comprises a plurality of MO's 110A-110D, each configured to generate a component input beam 120A-120D with a different respective wavelength $\lambda_A, \lambda_B, \lambda_C, \lambda_D$ and a different respective angle of incidence, preferably a component input beam 120A-120D of low power seed light. The component input beams 120A-120D pass through respective birefringent elements 135A-135D, which, for at least one of the component input beams 120A-120D, delays the transmission of approximately 50% of the total power of that component along one orthogonal polarization axis. The delay time is preferably at least approximately equal to or greater than the coherence time of the component input beams 120A-120D. As a result, the polarizations of the light along the two orthogonal axes are again uncorrelated for the resulting component transmission-delayed beams 137A-137D.

The component transmission-delayed beams 137A-137D then pass through respective polarization controllers 140A-140D and through other components including amplifiers 150A-150D, fiber array 220, collimating optic 230, compensating birefringent element 160, and beam sampler 165 before emerging as output beam 145. At least one polarization controller 140A-140D adjusts the polarization of at least one respective component transmission-delayed beam 127A-137D, to ensure that the polarizations of the respective components of output beam 145 are approximately equal to a desired polarization, thereby generating component polarization-controlled beams 142A-142D. In this example, the desired polarization is linear polarization.

After passing through respective polarization controllers 140A-140D, next, component polarization-controlled beams 142A-142D pass through respective fiber amplifiers 150A-150D.

Preferably, the fiber amplifiers 150A-150D comprise fiber that is non-PM fiber. The amplifiers 150A-150D may comprise active fiber. The amplifiers 150A-150D may comprise passive fiber. The fiber amplifiers 150A-150D preferably comprise optical fiber having low birefringence, for example, less than or equal to approximately $1 \times 10^{-5}$.

Amplifiers 150A-150D amplify at least one of the component controlled beams 142A-142D to the respective desired power levels, producing component amplified beams 152A-152D. The component amplified beams 152A-152D are then assembled, and sent into an appropriately spaced fiber array 220, which generates component assembled beams 222A-222D at appropriate angles of propagation.

After leaving fiber array 220, the component assembled beams 222A-222D pass through a collimating optic 230 that collimates these component assembled beams 222A-222D, producing component collimated beams 232A-232D, and directs the component collimated beams 232A-232D to compensating birefringent element 160. Compensating birefringent element 160 again approximately undoes the delays introduced by birefringent elements 135A-135D, removing the transmission delay between the two orthogonal polarization axes of the transmission-delayed components of the collimated beams 232A-232D.

After passing through compensating birefringent element 160, the collimated beams 232A-232D are directed onto combiner 240 at the appropriate angles of incidence where they are spectrally combined, after which the combined beam 242 passes through beam sampler 165 and then emerges as output beam 145. In this example, the combiner 240 is preferably a grating 240. The grating 240 may have a dispersion matched to the plurality of beam wavelengths and to the plurality of angles of incidence.

Beam sampler 165 samples the output beam 145, transmitting a high power output beam 145 and reflecting a low power beam 172 that is directed to polarizing filter 175.

The polarizing filter 175 receives the low power beam 172 from the beam sampler 165 and filters it, transmitting a polarized beam 177 with the desired output polarization to the polarization detector 180 and reflecting light (not shown)

with a polarization other than the desired output polarization away from the polarization detector 180. According to embodiments of the invention, the polarizing filter 175 is preferably oriented at an angle of approximately 45° with respect to the polarization axes of the compensating birefringent element 160.

As above, polarization detector 180 detects the polarization state of the polarized beam 177 and transmits output in the form of polarization feedback 185 to a polarization processor 190 which transmits polarization instructions 195 to the polarization controllers 140A-140D based on the polarization feedback 185. Preferably, the polarization feedback 185 may be in the form of a polarization error signal 185.

Following polarization instructions 195, polarization modulators 140A-140D adjust the polarization of output beam 145 to minimize (or maximize) the polarization error signal 185. The polarization feedback 185 and the polarization feedback control loop within the polarization processor 190 ensure that the polarization controllers 140A-140D adjust the polarization of the output beam 145 so that it is approximately equal to the desired linear output polarization, promoting efficient combination by the diffraction grating 240 and an improvement by a factor of approximately two in the SBS threshold.

Other coherent combination approaches are also applicable pursuant to alternative embodiments of the invention. An apparatus for suppression of SBS uses polarization control and phase control according to embodiments of the invention with a tapered fiber bundle as the fiber array 150 pursuant to a coherent signal combination architecture such as those shown in FIGS. 2-4. An apparatus for suppression of SBS uses polarization control and phase control according to embodiments of the invention with a standard phased tiled fiber array as the fiber array 150 pursuant to a coherent signal combination architecture such as those shown in FIGS. 2-4. In both cases, in analogy with the examples shown in FIGS. 2-4, the output beam 145 is sampled to detect both the phase and the state of polarization.

Other approaches to increasing total system power include increasing the number of fibers, the area of the fiber core, and bandwidth used in each fiber amplifier, but these have various practical limitations. In any case, the method described herein augments whatever other methods are employed towards higher laser system power.

Figure 6:
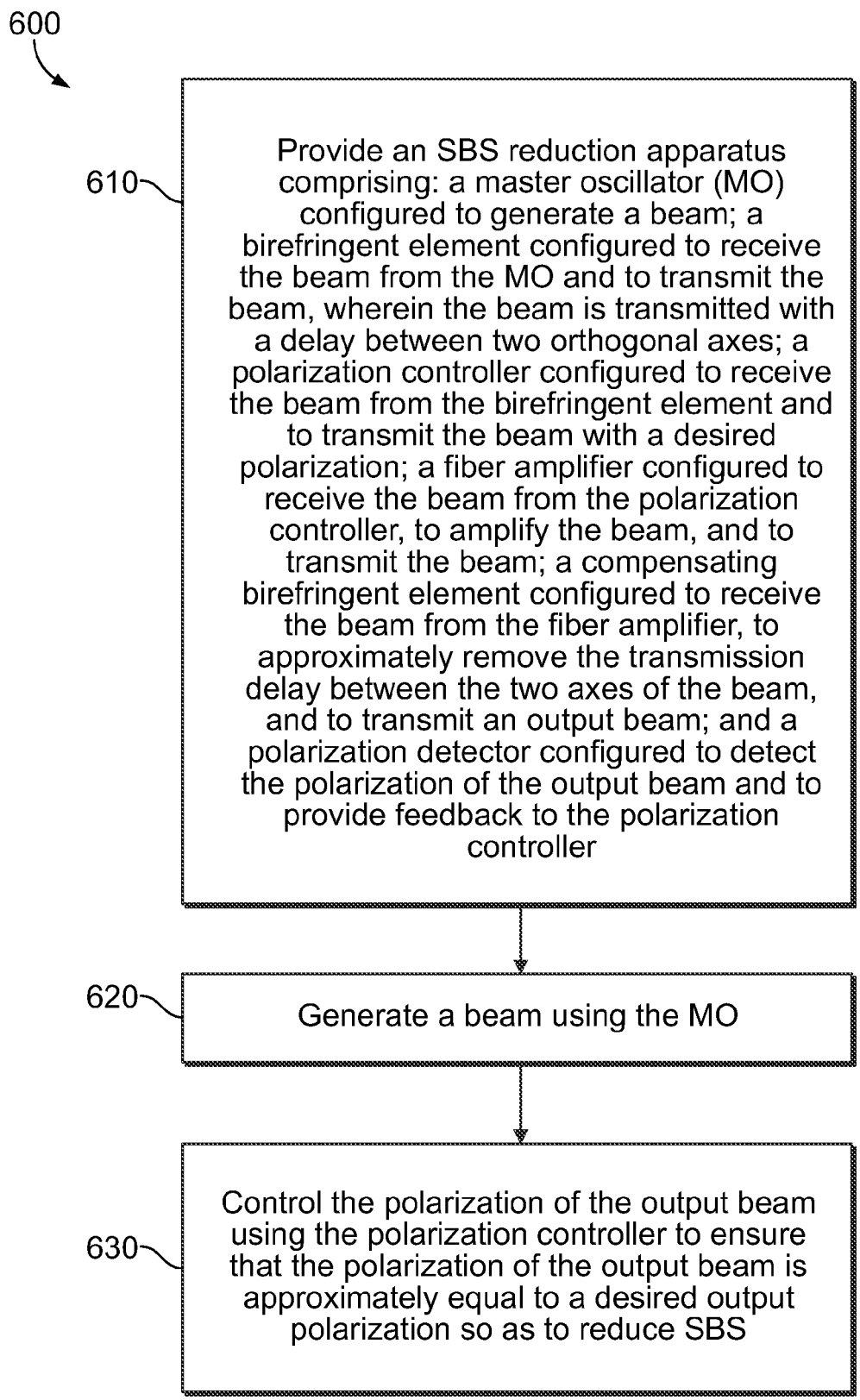
FIG. 6 is a flowchart of a method for suppressing SBS using polarization control and a birefringent delay element in a fiber amplifier beam combination system that employs a single beam.

FIG. 6 is a flowchart of a method 600 for suppression of SBS using a single beam in a high power polarization maintaining fiber amplifier system as described in various representative embodiments. The order of the steps in the method 600 is not constrained to that shown in FIG. 6 or described in the following discussion. Several of the steps could occur in a different order without affecting the final result.

In block 610, an SBS reduction apparatus is provided comprising: a master oscillator (MO) configured to generate a beam; a birefringent element configured to receive the beam from the MO and to transmit the beam, wherein the beam is transmitted with a delay between two orthogonal axes; a polarization controller configured to receive the beam from the birefringent element and to transmit the beam with a desired polarization; a fiber amplifier configured to receive the beam from the polarization controller, to amplify the beam, and to transmit the beam; a compensating birefringent element configured to receive the beam from the fiber amplifier, to approximately remove the transmission delay between the two axes of the beam, and to transmit an output beam; and a polarization detector configured to detect the polarization of the output beam and to provide feedback to the polarization controller. Block 610 then transfers control to block 620.

In block 620, a beam is generated using the MO. Block 620 then transfers control to block 630.

In block 630, the polarization of the output beam is controlled using the polarization controller to ensure that the polarizations of the output beams are approximately equal to a desired output polarization so as to reduce SBS. Block 630 then terminates the process.

Figure 7:
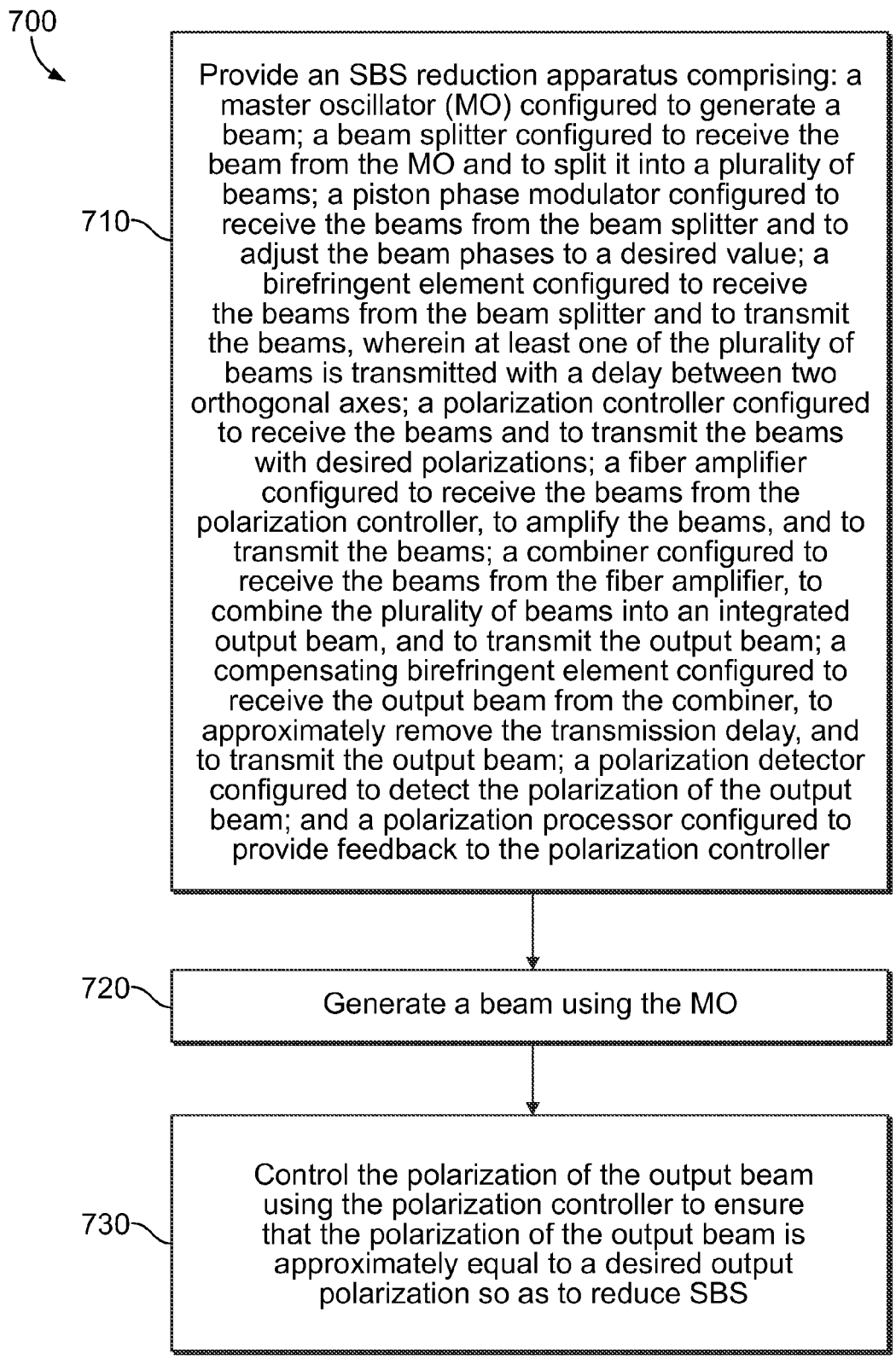
FIG. 7 is a flowchart of a method for suppressing SBS using polarization control and a birefringent delay element in a fiber amplifier beam combination system that employs a beam splitter.

FIG. 7 is a flowchart of another representative embodiment of a method 700 for suppression of SBS using polarization control and a beam splitter in a high power polarization maintaining fiber amplifier system. The order of the steps in the method 700 is not constrained to that shown in FIG. 7 or described in the following discussion. Several of the steps could occur in a different order without affecting the final result.

In block 710, an SBS reduction apparatus is provided comprising: a master oscillator (MO) configured to generate a beam; a beam splitter configured to receive the beam from the MO and to split it into a plurality of beams; a piston phase modulator configured to receive the beams from the beam splitter and to adjust the beam phases to a desired value; a birefringent element configured to receive the beams from the beam splitter and to transmit the beams, wherein at least one of the plurality of beams is transmitted with a delay between two orthogonal axes; a polarization controller configured to receive the beams and to transmit the beams with desired polarizations; a fiber amplifier configured to receive the beams from the polarization controller, to amplify the beams, and to transmit the beams; a combiner configured to receive the beams from the fiber amplifier, to combine the plurality of beams into an integrated output beam, and to transmit the output beam; a compensating birefringent element configured to receive the output beam from the combiner, to approximately remove the transmission delay, and to transmit the output beam; a polarization detector configured to detect the polarizations of the output beam; and a polarization processor configured to provide feedback to the polarization controller. Block 710 then transfers control to block 720.

In block 720, a beam is generated using the MO. Block 720 then transfers control to block 730.

In block 730, the polarization of the output beam is controlled using the polarization controller to ensure that the polarization of the output beam is approximately equal to a desired output polarization so as to reduce SBS. Block 730 then terminates the process.

While the above representative embodiments have been described with certain components in exemplary configurations, it will be understood by one of ordinary skill in the art that other representative embodiments can be implemented using different configurations and/or different components. For example, it will be understood by one of ordinary skill in the art that the order of certain components can be altered without substantially impairing the functioning of the invention. For example, the polarization controllers 140A-140E can be positioned before the piston phase modulators 130A-130E in FIG. 2 without substantially impairing the functioning of the invention. As another example, the beam sampler 165 and the auxiliary beam sampler 250 in FIG. 2 can be integrated into the same beam sampling device.

The representative embodiments and disclosed subject matter, which have been described in detail herein, have been presented by way of example and illustration and not by way of limitation. It will be understood by those skilled in the art that various changes may be made in the form and details of the described embodiments resulting in equivalent embodiments that remain within the scope of the appended claims.

What is claimed is:

1. An apparatus for reducing stimulated Brillouin scattering (SBS), comprising:
   a master oscillator (MO) configured to generate a beam;
   a birefringent element configured to receive the beam from the MO and to transmit the beam, wherein the beam is transmitted with a delay between two orthogonal axes;
   a polarization controller configured to receive the beam from the birefringent element and to transmit the beam with a desired polarization;
   a fiber amplifier configured to receive the beam from the polarization controller, to amplify the beam, and to transmit the beam;
   a compensating birefringent element configured to receive the beam from the fiber amplifier, to approximately remove the transmission delay between the two axes of the beam, and to transmit an output beam; and
   a polarization detector configured to detect the polarization of the output beam and to provide feedback to the polarization controller to ensure that the polarization of the output beam is approximately equal to a desired output polarization, so as to reduce SBS.

2. The apparatus as recited in claim 1, further comprising:
   a piston phase modulator configured to receive the beam from the MO and to adjust the beam phase to a desired value.

3. The apparatus as recited in claim 2, wherein the piston phase modulator is configured to increase the bandwidth of the beam.

4. The apparatus as recited in claim 2, further comprising:
   a phase detector configured to detect the phase of the output beam; and
   a phase processor configured to provide feedback to the piston phase modulator to ensure that the output beam has a desired phase.

5. The apparatus as recited in claim 1, further comprising:
   a combiner configured to receive the beams from the fiber amplifier, to combine the plurality of beams into an integrated output beam, and to transmit an output beam.

6. The apparatus as recited in claim 5, further comprising:
   a beam sampler configured to receive the beams from the combiner, to sample the output beam, to transmit the output beam, and to reflect a low power beam, wherein the compensating birefringent element is configured to receive the low power beam instead of the output beam, wherein the compensating birefringent element is further configured to approximately remove the transmission delay between the two axes of the low power beam, and to transmit the low power beam.

7. The apparatus as recited in claim 1, further comprising:
   a polarization processor configured to provide feedback to the polarization controller to ensure that the polarization of the output beam is approximately equal to a desired output polarization, wherein the polarization controller is instead configured to detect the polarization of the output beam.

8. The apparatus as recited in claim 1, where the fiber amplifier further comprises:
   at least one fiber amplifier stage configured to receive the beam from the polarization controller, to amplify the beam, and to transmit the beam.

9. The apparatus as recited in claim 8, wherein at least two fiber amplifier stages are separated by an optical isolator.

10. An apparatus for reducing stimulated Brillouin scattering (SBS), comprising:
    a master oscillator (MO) configured to generate a beam;
    a beam splitter configured to receive the beam from the MO and to split it into a plurality of beams;
    a piston phase modulator configured to receive the beams from the beam splitter and to adjust the beam phases to a desired value;
    a birefringent element configured to receive the beams from the piston phase modulator and to transmit the beams, wherein at least one of the plurality of beams is transmitted with a delay between two orthogonal axes;
    a polarization controller configured to receive the beams from the birefringent element and to transmit the beams with desired polarizations;
    a fiber amplifier configured to receive the beams from the polarization controller, to amplify the beams, and to transmit the beams;
    a combiner configured to receive the beams from the fiber amplifier, to combine the beams into an integrated output beam, and to transmit the output beam;
    a compensating birefringent element configured to receive the output beam from the combiner, to approximately remove the delay between the two axes of at least one of the output beams, and to transmit the output beam;
    a polarization detector configured to detect the polarization of the output beam; and
    a polarization processor configured to provide feedback to the polarization controller to ensure that the polarization of the output beam is approximately equal to a desired output polarization, so as to reduce SBS.

11. The apparatus as recited in claim 10, wherein a broadening phase modulator is used to increase the bandwidth of the MO.

12. The apparatus as recited in claim 10, further comprising:
    a phase detector configured to detect the phase of the output beam; and
    a phase processor configured to provide feedback to the piston phase modulator to ensure that the output beam has a desired phase.

13. The apparatus as recited in claim 10, wherein:
    the combiner is configured to coherently combine the plurality of beams into an output beam.

14. An apparatus for reducing stimulated Brillouin scattering (SBS), comprising:
    a master oscillator (MO) configured to generate a beam;
    a beam splitter configured to receive the beam from the MO and to split it into a plurality of beams;
    a piston phase modulator configured to receive the plurality of beams from the beam splitter and to adjust the phases of one or more of the plurality of beams to desired phases;
    a birefringent element configured to receive the beams from the piston phase modulator and to transmit the beams, wherein at least one of the plurality of beams is transmitted with a delay between two orthogonal polarization axes;
    a polarization controller configured to receive the beams from the birefringent element and to transmit the beams with desired polarizations;
    a fiber amplifier configured to receive the beams from the polarization controller, to amplify the beams, and to transmit the beams;

a combiner configured to receive the beams from the fiber amplifier, to coherently combine the plurality of beams into an integrated output beam, and to transmit an output beam;

a beam sampler configured to receive the beams from the combiner, to sample the output beam, to transmit the output beam, and to reflect a low power beam;

a compensating birefringent element configured to receive the low power beam from the beam sampler, to approximately remove the transmission delay between the two axes of the low power beam, and to transmit the low power beam;

a phase detector configured to detect the phase of the low power beam;

a phase processor configured to provide feedback to the piston phase modulator to ensure that the output beam has the desired phase;

a polarization detector configured to detect the polarization of the output beam; and a polarization processor configured to provide feedback to the polarization controller to ensure that the polarization of the output beam is approximately equal to a desired output polarization, so as to reduce SBS.

15. An apparatus for reducing stimulated Brillouin scattering (SBS), comprising:

a master oscillator (MO) configured to generate a beam;

a birefringent element configured to receive the beam from the MO and to transmit the beam, wherein the beam is transmitted with a delay between two orthogonal axes;

a beam splitter configured to receive the beam from the birefringent element and to split it into a plurality of beams;

a piston phase modulator configured to receive the plurality of beams from the beam splitter and to adjust the phases of one or more of the plurality of beams to desired phases;

a polarization controller configured to receive the beams from the piston phase modulator and to transmit the beams with desired polarizations;

a fiber amplifier configured to receive the beams from the polarization controller, to amplify the beams, and to transmit the beams;

a combiner configured to receive the beams from the fiber amplifier, to combine the plurality of beams into an integrated output beam, and to transmit an output beam;

a compensating birefringent element configured to receive the output beam from the combiner, to approximately remove the delay between the two axes of at least one of the output beams, and to transmit the output beam;

a phase detector configured to detect the phase of the output beam;

a phase processor configured to provide feedback to the piston phase modulator to ensure that the plurality of phase-modulated beams have the desired phases;

a polarization detector configured to detect the polarization of the output beam; and a polarization processor configured to provide feedback to the polarization controller to ensure that the polarization of the output beam is approximately equal to a desired output polarization, so as to reduce SBS.

16. The apparatus as recited in claim 15, wherein a broadening phase modulator is used to increase the bandwidth of the MO.

17. An apparatus for reducing stimulated Brillouin scattering (SBS), comprising:

a plurality of master oscillators (MO's) configured to generate a plurality of beams of differing wavelengths and differing angles of incidence;

a birefringent element configured to receive the plurality of beams from the plurality of MO's and to transmit the beams, wherein the beams are transmitted with a delay between two orthogonal axes;

a polarization controller configured to receive the beams from the birefringent element and to transmit the beams with desired polarizations;

a fiber amplifier configured to receive the beams from the polarization controller, to amplify the beams, and to transmit the beams;

a compensating birefringent element configured to receive the beams from the fiber amplifier, to approximately remove the delay between the two axes of at least one of the beams, and to transmit the beams;

a combiner configured to receive the beams from the compensating birefringent element, to combine the plurality of beams into an integrated output beam, and to transmit an output beam;

a polarization detector configured to detect the polarization of the output beam; and a polarization processor configured to provide feedback to the polarization controller to ensure that the polarization of the output beam is approximately equal to a desired output polarization, so as to reduce SBS.

18. The apparatus as recited in claim 17, wherein a broadening phase modulator is used to increase the bandwidth of the MO.

19. The apparatus as recited in claim 17, wherein the combiner is a diffraction grating with a dispersion matched to the plurality of beam wavelengths and to the plurality of angles of incidence.

20. A method for reducing stimulated Brillouin scattering, comprising:

providing a stimulated Brillouin scattering (SBS) reduction apparatus comprising:

a master oscillator (MO) configured to generate a beam;

a birefringent element configured to receive the beam from the MO and to transmit the beam, wherein the beam is transmitted with a delay between two orthogonal axes;

a polarization controller configured to receive the beam from the birefringent element and to transmit the beam with a desired polarization;

a fiber amplifier configured to receive the beam from the polarization controller, to amplify the beam, and to transmit the beam;

a compensating birefringent element configured to receive the beam from the fiber amplifier, to approximately remove the transmission delay between the two axes of the beam, and to transmit an output beam; and a polarization detector configured to detect the polarization of the output beam and to provide feedback to the polarization controller;

generating a beam using the MO; and controlling the polarization of the output beam using the polarization controller to ensure that the polarization of the output beam is approximately equal to a desired output polarization, so as to reduce SBS.

21. A method for reducing stimulated Brillouin scattering, comprising:

providing a stimulated Brillouin scattering (SBS) reduction apparatus comprising:

a master oscillator (MO) configured to generate a beam;

a beam splitter configured to receive the beam from the MO and to split it into a plurality of beams;

a piston phase modulator configured to receive the beams from the beam splitter and to adjust the beam phases to a desired value;

a birefringent element configured to receive the beams from the piston phase modulator and to transmit the beams, wherein at least one of the plurality of beams is transmitted with a delay between two orthogonal axes;

a polarization controller configured to receive the beams from the birefringent element and to transmit the beams with desired polarizations;

a fiber amplifier configured to receive the beams from the polarization controller, to amplify the beams, and to transmit the beams;

a combiner configured to receive the beams from the fiber amplifier, to combine the plurality of beams into an integrated output beam, and to transmit the output beam;

a compensating birefringent element configured to receive the output beam from the combiner, to approximately remove the transmission delay, and to transmit the output beam;

a polarization detector configured to detect the polarization of the output beam; and a polarization processor configured to provide feedback to the polarization controller;

generating a beam using the MO; and controlling the polarization of the output beam using the polarization controller to ensure that the polarization of the output beam is approximately equal to a desired output polarization, so as to reduce SBS.

22. The method of claim 21, wherein the SBS reduction apparatus further comprises:

a beam sampler configured to receive the beams from the combiner, to sample the output beam, to transmit the output beam, and to reflect a low power beam, wherein the compensating birefringent element is configured to receive the low power beam instead of the beam, wherein the compensating birefringent element is further configured to approximately remove the transmission delay between the two axes of the low power beam, and to transmit the low power beam.

\* \* \* \* \*